Patented May 5, 1953

2,637,743

UNITED STATES PATENT OFFICE 2,637,743

PREPARATION OF DERIVATIVES OF 1,4-DI-AMINOBENZENE-N-SULFONIC ACID

Robert Lazare Lantz, Paris, and Gilbert Henri Victor Krémer, Ermont, France, assignors to Compagnie Française des Matieres Colorantes S. A. R. L., Paris, France, a company of France No Drawing. Application March 20, 1951, Serial No. 216,666. In France November 30, 1950

3 Claims. (Cl. 260—500)

1

The present invention relates to water soluble salts of 1,4-diaminobenzene-N-sulphonic acid. In particular it relates to water soluble salts of those 1,4-diaminobenzene-N-sulphonic acid the amino group in the 1 position of which is substituted with a hydrocarbon radical, having the general formula

where R is a hydrocarbon.

It has been found that water soluble salts of the 1,4-diaminobenzene-N-sulphonic acid, the amino group in the 1 position of which is substituted with a hydrocarbon radical, can be prepared by reacting, in the presence of water, an alkali metal bisulphite and a substance raising the pH of the mixture, with a 4-nitro-aminobenzene, the amino group of which is substituted with a hydrocarbon radical.

The substance to raise the pH of the mixture can be one selected from the group which consists of caustic alkalis, alkali metal carbonates or alkali metal sulphites.

Alkali metal salts of certain primary arylamines the amino group of which is substituted with a sulphonic group have already been prepared by reacting a mixture of sodium sulphite and sodium bisulphite with the corresponding aromatic nitro-derivatives.

However, the reaction does not appear to have been carried out on the corresponding nitro derivatives which carry an amino group either unsubstituted or substituted by a hydrocarbon residue; several attempts have already been made to do this, using bisulphite alone, without sulphite, but they have only given very bad results (Hugo Weil and Karl Weisse, German Patent No. 221,301 of January 9, 1909; Hugo Weil Wassermann, Ber., vol. 55, p. 2540).

The reaction according to the present invention is therefore quite unexpected.

It has been proved, moreover advantageous to work in the presence of a solvent miscible with water such as for example, alcohol.

The produce so obtained can be used, in particular, in the dyestuffs, dyeing and printing industries.

In the following example, which illustrates the present invention, without in any way limiting it, the quantities are given by weight except where indicated to the contrary.

2

Example.—A mixture containing 20 parts of N(4-nitrophenyl)-amino benzene, 24.5 parts of sodium bisulphite, 29.7 parts of anhydrous sodium sulphite, 102 parts of water and 60 parts by volume of 95% alcohol are stirred for four hours at 130° C. in a closed apparatus.

The alcohol is distilled off, after addition of 3 parts of sodium carbonate and sufficient water to give a filterable solution on completion of distillation. The liquid remaining after this distillation is filtered and allowed to cool to 20° C. Sodium N-phenyl-1, 4-diaminobenzene-N-sulphonate crystallises out. After filtering by suction and drying, it has a very clear colour.

We claim:

1. A process for preparing a water soluble salt of N-phenyl-1, 4-diaminobenzene-N'-sulphonic acid which comprises heating an alkali metal bisulphite and a product to raise the pH of the mixture with N(4-nitrophenyl) amino benzene in the presence of water said product to raise the pH of the mixture being a member of the group consisting of caustic alkalies, alkali metal carbonates and sulphites.

2. A process for preparing a water soluble salt of N-phenyl-1, 4-diaminobenzene-N'-sulphonic acid which comprises heating an alkali metal bisulphite and a product to raise the pH of the mixture with N(4-nitrophenyl) amino benzene in the presence of water, said product to raise the pH of the mixture being a member of the group consisting of caustic alkalies, alkali metal carbonates and sulphites in which a water miscible solvent is also employed.

3. A process of preparation of sodium N-phenyl-1,4-diaminobenzene - N' - sulphonate which consists of heating sodium bisulphite and sodium sulphite with N(4-nitrophenyl)amino benzene in the presence of water and alcohol.

ROBERT LAZARE LANTZ.
GILBERT HENRI VICTOR KRÉMER.

References Cited in the file of this patent

UNITED STATES PATENTS

| Number | Name | Date |
|---|---|---|
| 2,241,769 | Dickey et al. | May 13, 1941 |

OTHER REFERENCES

Weil et al.: Chem. Abst., vol. 17, pp. 993–994 (1923) or Ber., vol. 55, pages 2533–2542 (1922).